(12) United States Patent  
Peters et al.

(10) Patent No.: US 6,901,142 B1  
(45) Date of Patent: May 31, 2005

(54) NETWORK TERMINATION OF A TELECOMMUNICATIONS NETWORK

(75) Inventors: Wolfgang Peters, Tamm (DE); Gerhard Schneider, Leonberg (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/401,123

(22) Filed: Sep. 22, 1999

(30) Foreign Application Priority Data

Sep. 23, 1998 (DE) .......................................... 19843601

(51) Int. Cl.⁷ .......................... H04M 1/00; H04M 9/00; H04M 11/00
(52) U.S. Cl. .............................. 379/413.02; 379/93.07; 379/93.09; 379/93.14; 379/93.29; 379/399.01
(58) Field of Search ........................... 379/93.05, 93.06, 379/93.09, 93.11, 93.15, 100.15, 100.16, 399.01, 399.02, 413.03, 387.01, 387.02, 93.07, 93.14, 93.29

(56) References Cited

U.S. PATENT DOCUMENTS

| | | | | | |
|---|---|---|---|---|---|
| 4,922,484 A | * | 5/1990 | Yoshida et al. | ............. | 370/421 |
| 5,113,396 A | * | 5/1992 | Kagami | ....................... | 370/466 |
| 5,134,611 A | * | 7/1992 | Steinka et al. | ............... | 370/466 |
| 5,150,402 A | * | 9/1992 | Yamada | .................... | 379/93.06 |
| 5,204,861 A | * | 4/1993 | Wiebe | ........................ | 370/524 |
| 5,214,650 A | * | 5/1993 | Renner et al. | ............... | 370/276 |
| 5,305,312 A | * | 4/1994 | Fornek et al. | ............... | 370/264 |
| 5,311,590 A | * | 5/1994 | Arnold et al. | ................ | 370/465 |
| 5,577,105 A | * | 11/1996 | Baum et al. | .............. | 379/93.05 |
| 5,583,922 A | * | 12/1996 | Davis et al. | ............. | 379/93.09 |
| 5,604,785 A | * | 2/1997 | Pryor et al. | ...................... | 379/2 |
| 5,621,731 A | * | 4/1997 | Dale et al. | ................... | 370/257 |
| 5,708,663 A | * | 1/1998 | Wright et al. | ................ | 370/524 |
| 5,724,661 A | * | 3/1998 | Nagashima | ................... | 455/462 |
| 5,761,293 A | * | 6/1998 | Newlin et al. | ............... | 379/230 |
| 5,995,595 A | * | 11/1999 | Hickey et al. | ........... | 379/88.12 |
| 6,069,890 A | * | 5/2000 | White et al. | ................. | 370/352 |
| 6,172,985 B1 | * | 1/2001 | Gilbert | ........................ | 370/465 |
| 6,215,868 B1 | * | 4/2001 | Inoue | .......................... | 379/387 |
| 6,343,118 B1 | * | 1/2002 | Haster | ...................... | 379/93.06 |
| 6,674,844 B1 | * | 1/2004 | Dryer et al. | .............. | 379/93.05 |

FOREIGN PATENT DOCUMENTS

| | | |
|---|---|---|
| DE | 195 14 275 A1 | 11/1995 |
| DE | 197 34 775 A1 | 10/1998 |
| EP | WO 97/37510 | * 10/1997 ........... H04Q/11/04 |

OTHER PUBLICATIONS

"Alcatel 1581 ID—NTtwin+, ISDN BRA NT1+2ab Equipment, Technical Description".

"Alcatel 1581 ID, NTtwin+, The Bridge to a New Technology".

* cited by examiner

Primary Examiner—Binh Tieu  
(74) Attorney, Agent, or Firm—Sughrue Mion, PLLC

(57) ABSTRACT

A network termination (NT) which is universally applicable and permits fair billing. The network termination (NT) according to the invention is characterized in that it comprises a switching facility (DET, 1, 2, 3) whereby the interface (a/b, U) on the network side is switchable from an analog one (a/b) to a digital one (U). A subscriber who needs a digital interface, for example because he wants to have two B channels of the ISDN at his free disposal, can release a digital interface (U) or have it released. A subscriber who wants only an analog access can release an analog access or have it released. To accomplish this, the network termination (NT) contains a switch (3) and a detector (DET). The switching between analog access and digital access on the network side can be effected without replacement of the network termination (NT).

1 Claim, 3 Drawing Sheets

(1a)

(1b)

(1c)

(1d)

NETWORK TERMINATION OF A TELECOMMUNICATIONS NETWORK

BACKGROUND OF THE INVENTION

This invention relates to a network termination of a telecommunications network having at least one interface on the network side and both analog and digital interfaces on the subscriber-line side.

A telecommunications network, particularly a telephone network, commonly comprises a number of exchanges that are connected with one another. A plurality of terminals are connected to each exchange. At the interface between each terminal and the telecommunications network, a network termination is provided.

FIG. 1 illustrates how the design of a network termination has changed in the course of time. FIG. 1a shows a network termination for an all-analog telecommunications network. The network termination NT has an analog interface a/b on the network side and an analog interface a/b on the subscriber-line side. Via the analog interface on the subscriber-line side, the terminal can connect an end instrument END, such as an analog telephone, to the telecommunications network.

FIG. 1b shows a network termination for an all-digital telecommunications network. The network termination NT has a digital interface U on the network side and a digital interface S on the subscriber-line side. Via the digital interface on the subscriber-line side, the terminal can connect an end instrument END, such as a digital telephone, to the telecommunications network.

FIG. 1c shows a network termination for an integrated services digital network (ISDN). The network termination NT has a digital interface U on the network side and two digital interfaces S1, S2 on the subscriber-line side. Via the digital interface S1, the terminal can connect a digital end instrument END1, e.g., a digital telephone or a PC, to the telecommunications network, and via the digital interface S2, it can additionally connect an analog end instrument END2, e.g., an analog telephone, using a terminal adapter TA. In the so-called basic access configuration, two 64-kb/s B channels are available to a terminal, which can be used independently of each other. For example, a telephone conversation can be conducted via the interface S2, and at the same time, Internet surfing is possible via the interface S1.

FIG. 1d also shows a network termination for an integrated services digital network, but here, the terminal adapter is incorporated in the network termination, so that analog end instruments END2, such as an analog telephone, can be connected directly to the network termination NT. This network termination NT thus offers maximum freedom of access on the subscriber-line side but has the disadvantage that on the network side, access is required to a digital telecommunications network, such as the ISDN. As a result; a subscriber wishing to operate only an analog end instrument has to pay an unduly high charge for being connected to a digital line.

The network termination shown in FIG. 1d corresponds in design and operation to the network termination NTtwin+, which is described in more detail in the Alcatel prospectus "Alcatel 1581 ID, NTtwin+, ISDN BRA NT1+2ab equipment, Technical Description" and in the Alcatel folder "Alcatel 1581 ID, NTtwin+, The bridge to a new technology".

SUMMARY OF THE INVENTION

It is an object of the invention to provide a network termination which is universally applicable and permits fair billing.

This object is attained by a network termination having at least one interface on the network side and having both analog and digital interfaces on the subscriber-line side, and also having a switch for switching the interface on the network side between analog and digital interfaces. The network termination is characterized in that it comprises a switching facility by which the interface on the network side is switchable from an analog one to a digital one. This also provides maximum freedom of access on the network side. A subscriber who needs a digital interface, for example because he wants to have two B channels at his free disposal, can release a digital interface or have it released. A subscriber who wants only an analog interface can release an analog interface or have it released. In a preferred embodiment of the invention, in which the switching is reversible, temporary switchover to an analog access can be effected to save connection charges, e.g., while the subscriber is on vacation, and temporary switchover to a digital access is possible, for example if the use of a video telephone is planned, which necessitates the simultaneous use of two B channels. The switching between analog access and digital access on the network side can be effected without replacing the network termination. Furthermore, the network termination represents an extension of the functionality of ISDN, since the switching from analog to digital can be undone, particularly without replacement of a network termination. This may reduce the restraint of customers during the envisaged transition from the analog network to the ISDN.

BRIEF DESCRIPTION OF THE DRAWINGS

One embodiment of the invention will now be described with reference to the remaining figures of the accompanying drawings, in which.

DETAILED DESCRIPTION OF THE INVENTION

Figure 1:
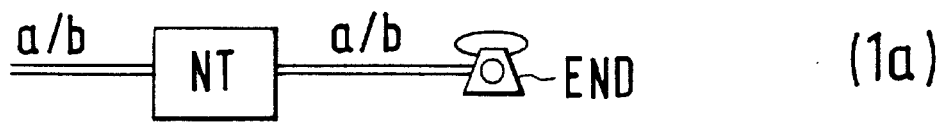
FIG. 1 illustrates how the design of a network termination has changed over the course of time.
Figure 1:
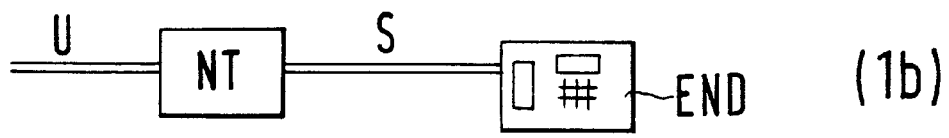
Figure 1:
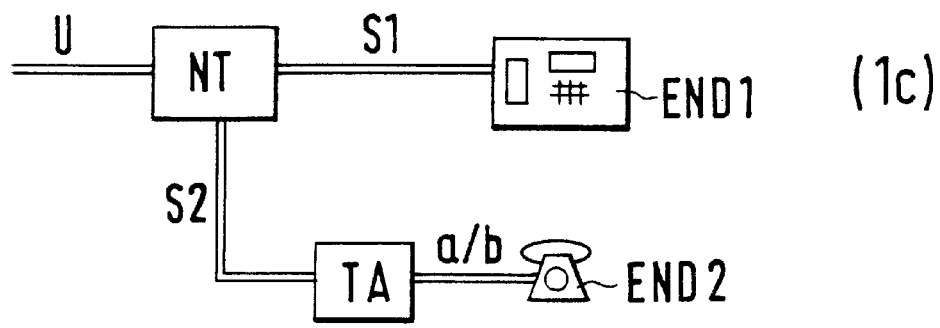
Figure 1:
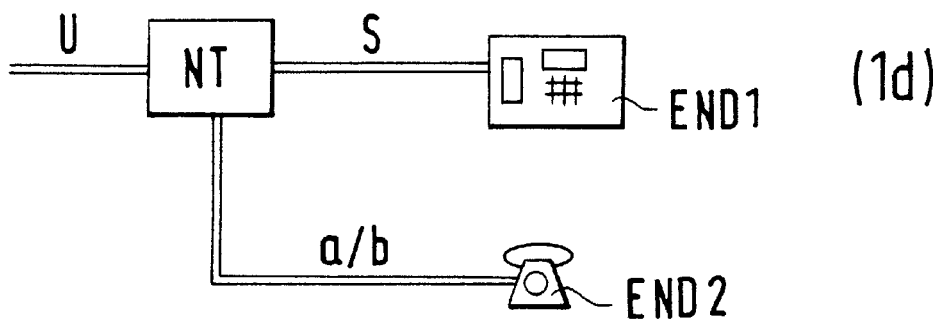
Figure 2:
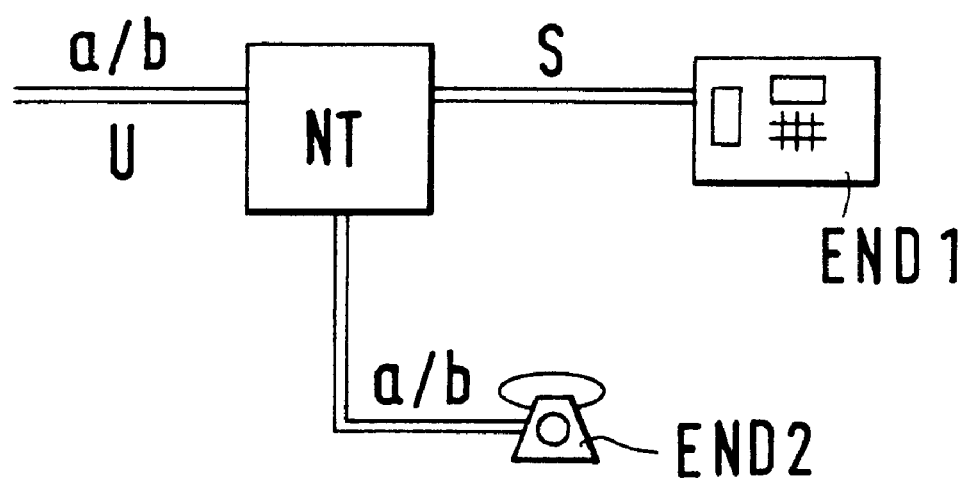
FIG. 2 shows a network termination according to the invention having two end instruments connected thereto.

The embodiment will first be explained with the aid of FIG. 2. FIG. 2 shows a network termination NT. The network termination NT comprises an interface a/b, U on the network side to interface the network termination to a telecommunications network. Furthermore, an analog interface a/b and a digital interface S are provided on the subscriber-line side for connecting at least one analog end instrument END2 and at least one digital end instrument END1, respectively. End instrument END1 is, for example, a digital telephone or computer, and end instrument END2 is, for example, an analog telephone or a fax machine. The telecommunications network is designed to support both analog and digital transmissions, e.g., by switching, at an exchange, from an analog network to a digital network. The analog network is, for example, the plain old telephone network (POTN), and the digital network may be the integrated services digital network (ISDN).

A subscriber is to be free to choose between access to the analog network and access to the digital network. To this end, the network termination NT comprises a switching means for switching the interface a/b, U on the network side from an analog a/b interface to a digital U interface. The switching means is implemented, for example, as an electronic switch, such as a relay. In the so-called basic access configuration in the ISDN, two 64-kb/s channels are available to a terminal, which can be used independently of each other. For this purpose, the subscriber-side interface of the network termination NT is designed as a so-called S or $S_0$ interface, and the interface on the network side is designed as a so-called U or $U_{k0}$ interface. In this manner, a subscriber who only wants an analog interface on the network side can continue to establish a connection to the analog network at low cost. A subscriber who wants a digital interface on the network side can set up a connection to the digital network with the same network termination NT. Further advantages result from the switching between analog network and digital network. The switching can be effected without interruption. For example, a subscriber books a digital access at the network operator. The exchange connected to the subscriber's terminal effects the connection setup telemetrically by transmitting a corresponding switching signal to the network termination NT. In particular, it is not necessary for a telecommunication fitter to replace the network termination NT by another one. Furthermore, the connection between the network termination NT and the exchange need not be opened for the purpose of initialization. As long as the initialization process for switching to the digital network is not complete, the subscriber can continue to use the analog line. As soon as the initialization process is complete, switchover is effected and a digital line is available to the subscriber. If the access structure is a basic ISDN access, the subscriber can continually use two 64-kb/s B channels simultaneously.

In a preferred embodiment, the switching means is suitable for reversibly switching between the analog a/b interface and the digital U interface on the network side. This is accomplished by means of a reversible switch, such as a relay or a transistor. This embodiment thus enables the subscriber to ask the network operator to switch his digital access back to an analog access. The switching back is effected by the exchange, which transmits a switching signal to the network termination NT, which causes the switching means to switch back to the analog interface on the network side. The switching is again effected without interruption and can be performed on-line at any time.

In the case of a digital access on the network side, all subscriber-side interfaces can be used; in the case of an analog access on the network side, only the analog subscriber-side interfaces can be used.

Figure 3:
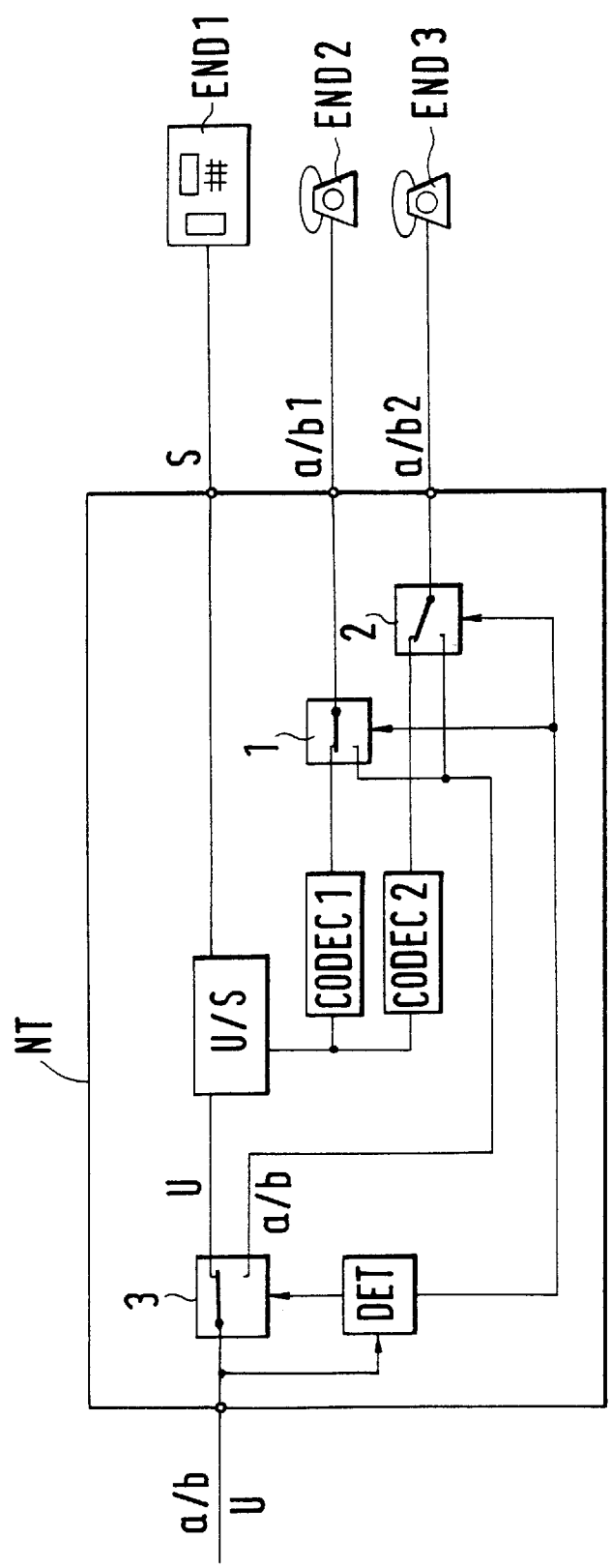
FIG. 3 shows a more detailed block diagram of another network termination according to the invention, to which three end instruments are connected.

The embodiment will now be further explained with the aid of FIG. 3. FIG. 3 shows a network termination NT to which three end instruments END1, END2, END3 are connected.

The network termination of FIG. 3 corresponds in its design and functionality to the network termination of FIG. 2. FIG. 3 shows the design in more detail. The switching means DET, 1, 2, 3 comprise a detector DET and a switch 3 interposed between the interface a/b, U on the network side, at least one analog interface a/b1, a/b2 on the subscriber-line side, and at least one digital interface S on the subscriber-line side. The detector DET is suitable for receiving a switching signal and for operating the switch 3 in response to the switching signal. The detector DET is implemented, for example, with a microprocessor or a digital signal processor which operates the switch 3 on receipt of an identification. For example, one identification may be given by the bit sequence 11111111, and another identification by the bit sequence 00000000. On receipt of the identification 11111111, the detector DET switches the switch 3 so that the interface on the network side is a digital interface. On receipt of the identification 00000000, the detector DET switches the switch 3 so that the interface of the network side is an analog interface.

The detector DET is suitable for receiving the switching signal telemetrically over the telecommunications network. For example, in response to a request from the subscriber to switch to an ISDN access, a switching signal containing the identification 11111111 is transmitted from the exchange to the terminal. The detector DET receives the identification and then effects a changeover. Alternatively or in addition, the network termination NT may be provided with a manually operable switch (not shown) which is connected to the detector DET. By actuating the switch, a switching signal is sent to the detector DET. The switch is designed, for example, as a two-position pushbutton switch or toggle switch. In one position, the detector DET causes the interface on the network side to operate as a digital interface, and in the other position, it causes this interface to operate as an analog interface. In addition, a light display, e.g., a LED display, may be provided which indicates the analog or digital mode of the interface, so that the subscriber can check which mode the network termination NT is in. In a simple mechanical version, the detector DET can be dispensed with. Via a mechanical switch accessible and operable from outside the network termination, e.g., a converted switch 3, switchover between analog interface and digital interface is effected directly by the subscriber. On each switchover, a signal is transmitted to the exchange, which then performs the necessary initialization and the billing. Thus, the subscriber is free to choose when to use which access, and can thus save charges, since the provision of a digital access, for example, costs more than the provision of an analog one.

The network termination NT contains at least one converting device CODEC1, CODEC2 for converting analog to digital signals. FIG. 3 shows two converting devices CODEC1, CODEC2, which serve to provide two analog interfaces a/b1, a/b2 on the subscriber-line side. The converting device CODEC1 converts the analog signals received over the analog interface a/b1 to digital ones, and the digital signals received over the telecommunications network and destined for the analog interface a/b1 to analog ones. In similar fashion, the converting device CODEC2 converts the signals received over the analog interface a/b2 and the signals destined for the analog interface a/b2. To accomplish this, each converting device CODEC1, CODEC2 contains an analog-to-digital converter, a digital-to-analog converter, and, if necessary, an encoder, a decoder, two filters, two equalizers, etc. Each of the converting devices CODEC1, CODEC2 performs the function of a terminal adapter.

The network determination NT further comprises at least one processing device U/S for adapting the protocol used for the digital signals on the subscriber-line side to that used for the digital signals on the network side. In FIG. 3, one processing device U/S is shown. The processing device U/S serves to provide an S interface on the subscriber-line side and a U interface on the network side so as to make the network termination NT suitable for use in an integrated services digital network (ISDN). The processing device U/S contains, for example, a microprocessor and a memory. In a basic access configuration, for example, the signals received over the interface S on the subscriber-line side contain 2×64 kb/s for the two B channels plus 16 kb/s for the signaling channel, the D channel. The interface on the network side processes a protocol at 160 kb/s. This protocol contains, besides the two B channels and the D channel, an additional control channel over which check information, such as parity bits, are transmitted. Protocol adaptation is performed in the processing device U/S. The microprocessor of the processing device U/S can also perform the function of the detector DET, so that a separate detector DET is not necessary.

The processing device U/S is connected on the subscriber-line side to the interface S and on the network side to the switch 3. Furthermore, it is connected to the converting devices CODEC1, CODEC2. If a digital access on the network side is connected through, the processing device U/S also performs the task to convert the signals received over the analog interfaces a/b1 and a/b2 on the subscriber-line side into the U-interface protocol and to carry out the preprocessing for signals received over the telecommunications network and destined for the two analog interfaces a/b1 and a/b2 on the subscriber-line side.

The network termination NT further includes two switches 1 and 2. Switch 1, e.g. a relay, is connected between the converting device CODEC1 and the analog interface a/b1 on the subscriber-line side. Switch 2, also implemented as a relay, for example, is connected between the converting device CODEC2 and the analog interface a/b2 on the subscriber-line side. The switches 1 and 2 serve to connect the analog interfaces a/b1 and a/b2 to the interface a/b, U on the network side if an analog access to the telecommunications network is desired, and to connect the analog interfaces a/b1 and a/b2 to the converting devices CODEC1 and CODEC2, respectively, if a digital access to the telecommunications network is desired. The switches 1 and 2 are controlled by the detector DET. They may also be switched by the mechanical switch used for the switch 3.

The detector DET is also suitable for influencing the supply of power to the converting devices CODEC1 and CODEC2 and to the processing device U/S. To this end, the detector DET is connected, for example, to the power supply for these devices. In the case of an analog interface on the network side, the devices are not needed. To save power, the detector DET turns off the power supply for the devices. This is done, for example, via a control transistor connected into the power supply path. In the case of a digital interface on the network side, the devices are needed only to obtain access to the telecommunications network, e.g. to make a telephone call. The detector DET monitors the interfaces on the subscriber-line side and switches the devices to a current-saving mode, e.g. standby, if no reception request is present and no connection exists on the network side. If, for example, a connection request is made via the analog interface a/b2, the power supply needs to be connected only to the devices U/S and CODEC2. The device CODEC1 can be operated in a power-saving mode or be switched off. If, for example, a connection request is made via the digital interface S, and the interfaces a/b1 and a/b2 are simultaneously inactive, the power supply needs to be connected only to the device U/S. The devices CODEC1 and CODEC2 can be operated in a current-saving mode or be switched off. After termination of the call, the device U/S can again be operated in a current-saving mode or be switched off.

What is claimed is:

1. A network termination of a telecommunications network, comprising an interface on the network side, at least one analog interface on the subscriber-line side, at least one digital interface on the subscriber-line side, and switching means for selectively coupling the interface on the network side to one of said at least one analog interface on the subscriber-line side and said at least one digital interface on the subscriber-line side, wherein the switching means comprise a detector and a switch controllable by the detector, and said switching means is interposed between the interface on the network side, the at least one analog interface on the subscriber-line side, and the at least one digital interface on the subscriber-line side, wherein the detector operates to receive a switching signal and operates the switch in response to the switching signal, and wherein the detector is operable to receive the switching signal telemetrically via the telecommunications network and via a manually operable switch provided at the network termination.

* * * * *